(12) United States Patent
Liusaari et al.

(10) Patent No.: US 11,405,746 B2
(45) Date of Patent: Aug. 2, 2022

(54) SYSTEM AND METHOD FOR PROVIDING ACCESS TO MEDIA CONTENT ASSOCIATED WITH EVENTS, USING A DIGITAL MEDIA CONTENT ENVIRONMENT

(71) Applicant: SPOTIFY AB, Stockholm (SE)

(72) Inventors: Ari Liusaari, London (GB); Felice Mancino, San Francisco, CA (US); Chris Linnett, London (GB)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 16/859,701

(22) Filed: Apr. 27, 2020

(65) Prior Publication Data

US 2021/0084435 A1 Mar. 18, 2021

Related U.S. Application Data

(63) Continuation of application No. 15/856,553, filed on Dec. 28, 2017, now Pat. No. 10,659,910.
(Continued)

(51) Int. Cl.
*H04W 4/02* (2018.01)
*H04M 1/725* (2021.01)
(Continued)

(52) U.S. Cl.
CPC .......... *H04W 4/021* (2013.01); *G06F 3/0484* (2013.01); *H04S 7/30* (2013.01); *H04M 1/7243* (2021.01); *H04M 1/72403* (2021.01)

(58) Field of Classification Search
CPC ..... H04W 4/021; H04M 1/725; G06F 3/0484; G06F 3/04; H04S 7/00; H04S 7/30
See application file for complete search history.

(56) References Cited

U.S. PATENT DOCUMENTS 10,672,371 B2 * 6/2020 Silverstein .............. G10L 25/15
10,928,998 B2 * 2/2021 Chase ..................... G06F 3/165
(Continued)

OTHER PUBLICATIONS

Liusaari, Office Action, U.S. Appl. No. 15/856,553, dated Dec. 14, 2018, 9 pgs.
(Continued)

*Primary Examiner* — Khawar Iqbal
(74) *Attorney, Agent, or Firm* — Morgan, Lewis & Bockius LLP

(57) ABSTRACT

In accordance with an embodiment, described herein is a system and method for providing access to media content associated with events, using a digital media content environment. A media application enables display of a memory event timeline, including a plurality of memory events, to provide an improved presentation of media consumption by a user that resembles a person's memory or recollection of such events. Recent events are generally presented with more specificity, with earlier time periods and events generally presented more broadly. An input action or request for a memory event can be performed to cause a media server to determine a corresponding historical media content for delivery, and to stream or buffer the historical media content related to that memory event, and/or to cause other systems or environments to provide additional content related to the memory event either via the media server, or directly delivered to the media device.

20 Claims, 6 Drawing Sheets

Related U.S. Application Data

(60) Provisional application No. 62/440,976, filed on Dec. 30, 2016.

(51) Int. Cl.
*H04W 4/021* (2018.01)
*H04S 7/00* (2006.01)
*G06F 3/0484* (2022.01)
*H04M 1/7243* (2021.01)
*H04M 1/72403* (2021.01)

(56) References Cited

U.S. PATENT DOCUMENTS

| | | | |
|---|---|---|---|
| 2007/0061759 A1* | 3/2007 | Klein, Jr. | G06F 16/637 |
| | | | 715/853 |
| 2014/0258553 A1* | 9/2014 | Skeen | H04L 65/4069 |
| | | | 709/231 |
| 2016/0142361 A1 | 5/2016 | Grossman et al. | |
| 2016/0212200 A1 | 7/2016 | Alonso et al. | |
| 2016/0248900 A1 | 8/2016 | Kim et al. | |
| 2017/0124524 A1 | 5/2017 | Scriven et al. | |
| 2017/0364589 A1* | 12/2017 | Roswell | G06F 16/683 |
| 2018/0041800 A1 | 2/2018 | Tilaye et al. | |
| 2018/0046624 A1* | 2/2018 | Chen | H04N 21/478 |
| 2018/0095621 A1 | 4/2018 | Ryan et al. | |
| 2018/0227066 A1* | 8/2018 | Fayyad | G06Q 30/0267 |
| 2019/0050115 A1 | 2/2019 | Krishna et al. | |
| 2019/0132382 A1 | 5/2019 | Alonso et al. | |
| 2019/0138173 A1* | 5/2019 | Grossman | G06F 3/0484 |
| 2019/0243535 A1 | 8/2019 | McLean et al. | |
| 2019/0305863 A1* | 10/2019 | Fayyad | H04H 60/372 |
| 2020/0264761 A1* | 8/2020 | Blohowiak | G06F 3/0481 |
| 2020/0319850 A1* | 10/2020 | Stasior | G06F 3/167 |
| 2021/0034203 A1* | 2/2021 | Kumar | G06F 40/174 |

OTHER PUBLICATIONS

Liusaari, Final Office Action, U.S. Appl. No. 15/856,553, dated Jul. 2, 2019, 13 pgs.

Liusaari, Notice of Allowance, U.S. Appl. No. 15/856,553, dated Jan. 14, 2020, 9 pgs.

\* cited by examiner

SYSTEM AND METHOD FOR PROVIDING ACCESS TO MEDIA CONTENT ASSOCIATED WITH EVENTS, USING A DIGITAL MEDIA CONTENT ENVIRONMENT

CLAIM OF PRIORITY

This application is a continuation of U.S. patent application titled "SYSTEM AND METHOD FOR PROVIDING ACCESS TO MEDIA CONTENT ASSOCIATED WITH EVENTS, USING A DIGITAL MEDIA CONTENT ENVIRONMENT", application Ser. No. 15/856,553, filed Dec. 28, 2017; which claims the benefit of priority to U.S. Provisional Patent Application titled "SYSTEM AND METHOD FOR PROVIDING ACCESS TO MEDIA CONTENT ASSOCIATED WITH EVENTS, USING A DIGITAL MEDIA CONTENT ENVIRONMENT", Application No. 62/440,976, filed Dec. 30, 2016; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to providing digital media content, and are particularly related to a system and method for providing access to media content associated with events, using a digital media content environment.

BACKGROUND

Today's consumers enjoy the ability to access a tremendous amount of media content, such as music and videos, using a wide variety of media devices. Digital media content environments, for example media streaming services such as Spotify, enable users to stream music content that complements their lifestyle, while commuting, exercising, relaxing at home, or engaging in other types of activities.

However, traditional media content environments and streaming services are generally operated to provide an immediate or current playback of media content, and are generally not designed for playback of a media content associated with past events.

SUMMARY

In accordance with an embodiment, described herein is a system and method for providing access to media content associated with events, using a digital media content environment. A media application enables display of a memory event timeline, including a plurality of memory events, to provide an improved presentation of media consumption by a user that resembles a person's memory or recollection of such events. Recent events are generally presented with more specificity, with earlier time periods and events generally presented more broadly. An input action or request for a memory event can be performed to cause a media server to determine a corresponding historical media content for delivery, and to stream or buffer the historical media content related to that memory event, and/or to cause other systems or environments to provide additional content related to the memory event either via the media server, or directly delivered to the media device.

DETAILED DESCRIPTION

As described above, digital media content environments, for example media streaming services such as Spotify, enable users to stream music content that complements their lifestyle, while commuting, exercising, relaxing at home, or engaging in other types of activities. However, traditional media content environments and streaming services are generally operated to provide an immediate or current playback of media content, and are generally not designed for playback of a media content associated with past events.

In accordance with an embodiment, described herein is a system and method for providing access to media content associated with events, using a digital media content environment. A media application enables display of a memory event timeline, including a plurality of memory events, to provide an improved presentation of media consumption by a user that resembles a person's memory or recollection of such events. Recent events are generally presented with more specificity, with earlier time periods and events generally presented more broadly. An input action or request for a memory event can be performed to cause a media server to determine a corresponding historical media content for delivery, and to stream or buffer the historical media content related to that memory event, and/or to cause other systems or environments to provide additional content related to the memory event either via the media server, or directly delivered to the media device.

Digital Media Content Environments

Figure 1:
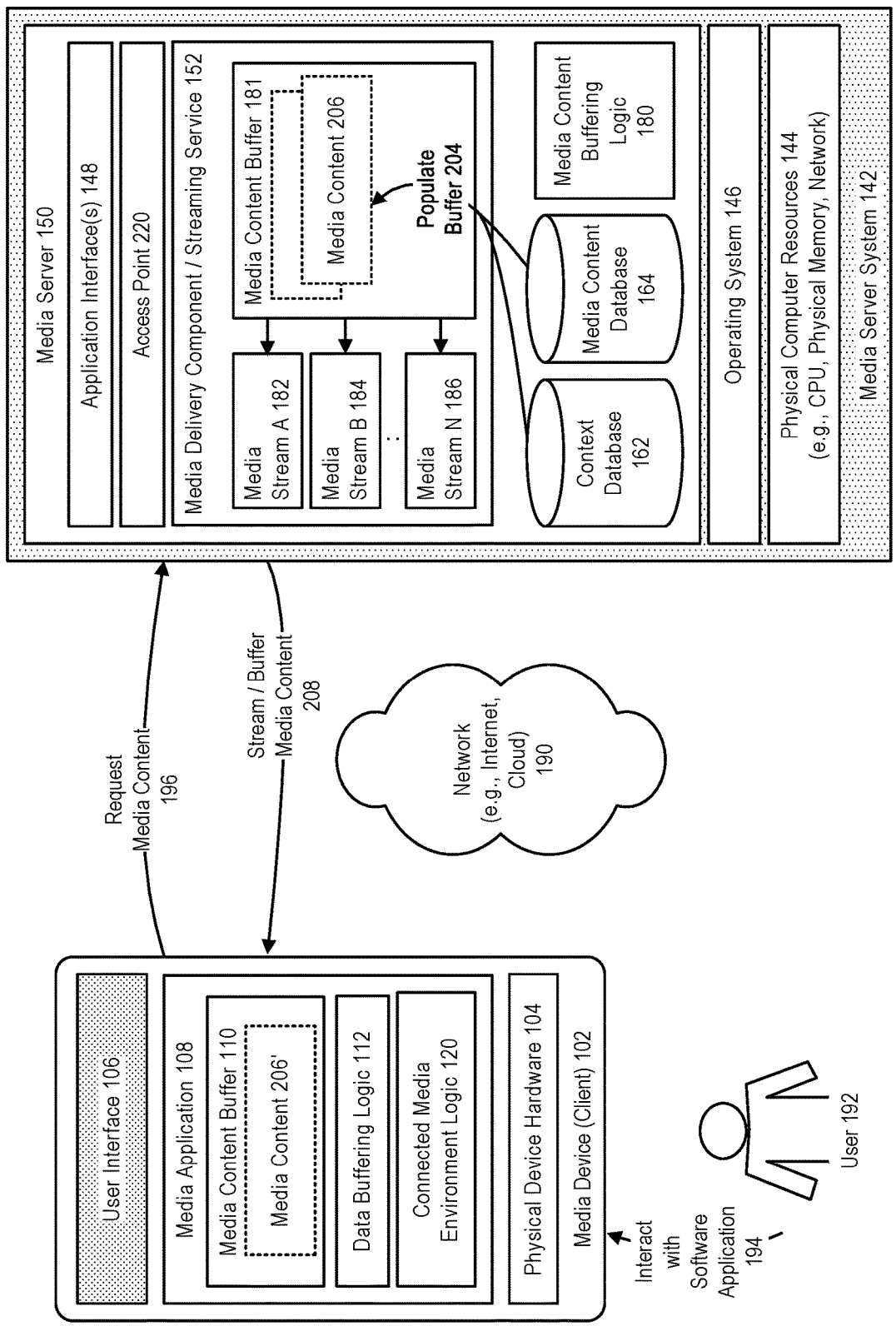
FIG. 1 illustrates an example digital media content environment, in accordance with an embodiment.

FIG. 1 illustrates an example digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system 146 or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, which can be provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "access-point", which forwards client requests to other servers, such as sending one or more metadataproxy requests to one of several metadataproxy machines, on behalf of the client or end user.

Memory Event Histories

In accordance with an embodiment, the system provides access to media content associated with events, including the use of a media application that enables display of a memory event timeline, including a plurality of memory events, to provide an improved presentation of media consumption by a user that resembles a person's memory or recollection of such events.

Figure 2:
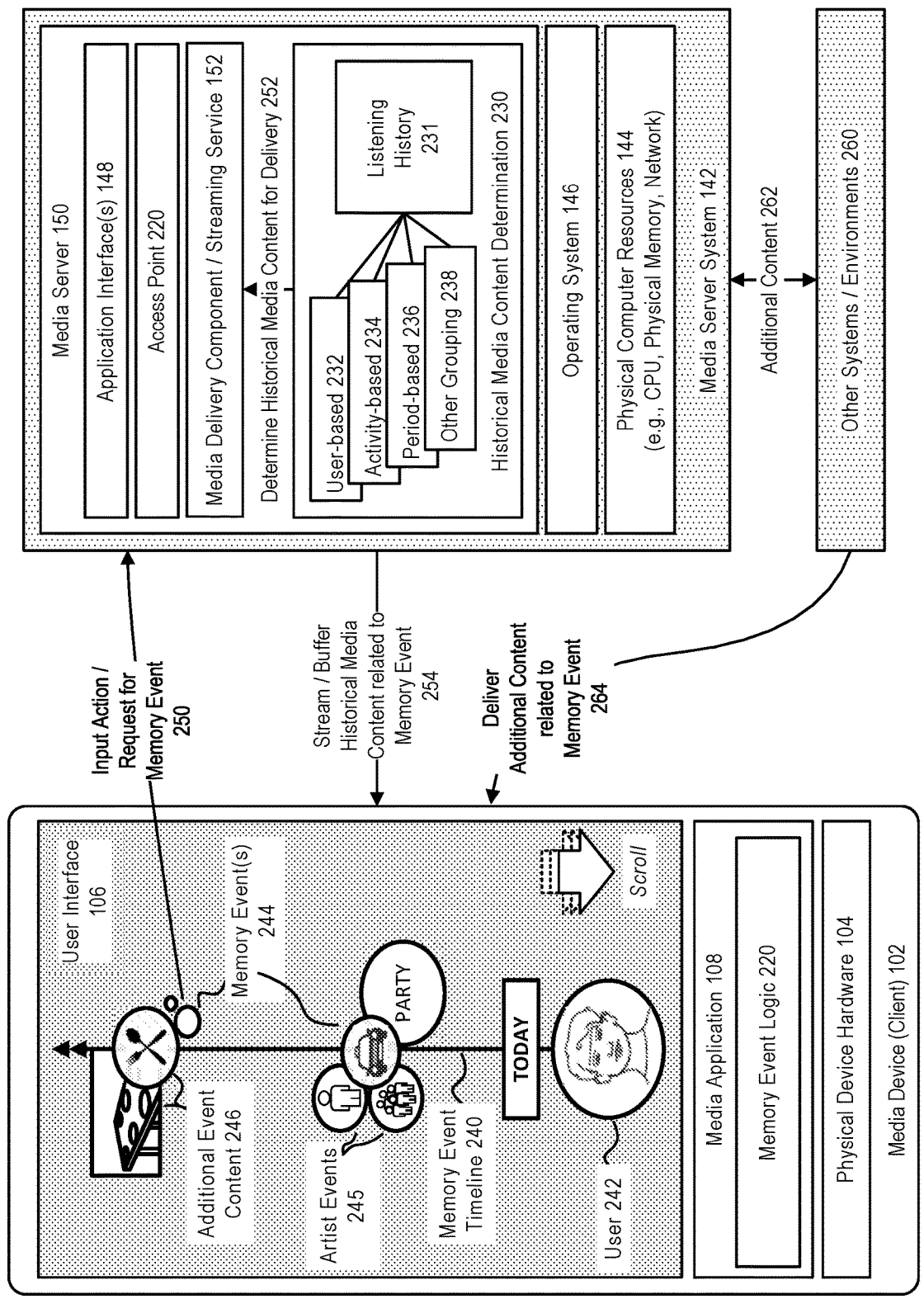
FIG. 2 illustrates a system for providing access to media content associated with events, using a digital media content environment, in accordance with an embodiment.

FIG. 2 illustrates a system for providing access to media content associated with events, using a digital media content environment, in accordance with an embodiment.

As illustrated in FIG. 2, in accordance with an embodiment, a media application configured according to a memory event logic 220, enables display of a memory event timeline 240 for a user (in this example associated with a user avatar 242), including a plurality of memory events 244, for example artist events 245, or other types of events, examples of which are further described below. In accordance with an embodiment, memory events can be optionally associated with an additional event content 246.

In accordance with an embodiment, more recent events can be arranged or displayed within the user interface along the memory event timeline, for example beginning at the bottom of the display screen and flowing backward chronologically from the user avatar towards the top of the display screen. Alternatively, the timeline can be arranged to flow, for example, backward chronologically towards the bottom of the display screen, or from one side of the display screen to the other. In accordance with other embodiments, other arrangements of the timeline and the display of memory events can be provided.

In accordance with an embodiment, the user can interact with the user interface to scroll through the memory event timeline, and access different events displayed along that timeline. For example, the system can display within a "Current week" those events that occurred within the past week, including in this example events categorized as "Party" music, and a taxi trip with acquaintances.

Generally, in accordance with an embodiment, primary groups of events can be introduced by a header, icon, or other type of graphical element (e.g., "Today" displayed inside a rectangle); with secondary groups of events displayed as a circle icon or other type of graphical element in various sizes (e.g., "Commute" is displayed as a small circle), and events that are further back in time indicated, for example, by a larger circle (e.g., "Summer '14"). Media content characteristics, such as genres, can be indicated, for example, as translucent grey circles, while artists can be indicated, for example, as circular photos.

The above are provided by way of example, to illustrate various types of icons or other graphical elements that can be used in accordance an embodiment. In accordance with other embodiments, other types of icons or graphical elements can be used to indicate or otherwise display various types of events, activities, media content characteristics, artists, or other information.

In accordance with an embodiment, at the media server, a historical media content determination component 230 enables the use of various groupings, for example, user-based 232, activity-based 234, period-based 236, or other types of groupings 238, to be used with a listening history 231, to determine a historical media content, for use with a memory event. The above types of groupings are similarly provided by way of example, to illustrate various types of groupings, and in accordance with other embodiments, other types of groupings can be used.

In accordance with an embodiment, an input action or request for a memory event 250 can be processed, to cause the media server to determine a corresponding historical media content for delivery 252, and to stream or buffer the historical media content related to that memory event 254, and/or to cause other systems or environments 260 to provide additional content 262 related to the memory event, either via the media server, or directly delivered to the media device 264.

For example, selecting a particular memory event icon can be processed by the media application to expand its event icon, and/or to launch an event screen that displays the media content which was consumed by the user at, or during, the event.

In accordance with an embodiment, a memory event to be included in the memory event timeline can be explicitly created by the user; or the event can be automatically added to the timeline via a feature of the media content provider that can identify an event, or via a third party service.

For example, a third-party ride-share or trip-request application can be used to report a particular taxi trip as an event, and the system can then add that event to the memory event timeline.

Similarly, a third-party application having a check-in feature can be used to report an event, so that the system can add the event to the timeline. For example, an application that accepts dinner reservations can be used to report a completed dinner and optionally a location of the meal, and add that additional content or information to the timeline. The location of the dinner can help refresh a user's memory as to whether the specific media content that the user is looking for was requested or otherwise consumed during that meal.

As another example, events such as birthdays, anniversaries and other events can be imported from a calendar application, and added to the timeline together with media content or additional content associated with the event.

In accordance with an embodiment, the media content consumed can be that media content which was played by the user at, or during, a particular event, for example through the user's media device or another device connected or associated with the user's profile, such as a home computer or a voice-enabled wireless speaker.

In accordance with various embodiments, the media content consumed can also be media content that is detected by the media device either passively, or upon request of the user.

For example, in accordance with an embodiment, services or applications can use a media device's built-in microphone to gather a brief sample of audio being played, create a fingerprint based on the sample, and compare it against a central database for potential matches. Other media content identification capabilities can be similarly used to request and receive information about a match, such as the artist, song title, and album, for subsequent insertion of such information into the user's memory event timeline.

In accordance with an embodiment, the primary action on a particular memory event displayed within the memory event timeline can be to "Replay" the music as is, or to "Discover" new music.

On a touch-screen user interface, these actions can be activated, for example, by one of tapping on the displayed event, or pressing and holding on the displayed event.

In accordance with an embodiment, when the primary action "Replay" is activated on a particular memory event, an associated music starts playing immediately, and a play queue is populated with additional associated music from that event.

In accordance with an embodiment, by use of a "Save" icon, the user can associate the music with a name and save it as a playlist, and the new name will be displayed with the memory event. The user can also use a queue editor to modify the queue while it is playing.

In accordance with an embodiment, when the primary action "Discover" is activated on a particular memory event, a discovery mode can return a short playlist created from the event.

In accordance with an embodiment, secondary actions can be associated with a particular event, which can reference other systems or applications, such as, for example: from a running event, link to the running app to see the run history; from a party event, link to social media where the party pictures were shared; from a concert event, link to concert images and other content from other users and/or official sites; or, from a road trip, link to a map covering the route driven and the music listened to.

In accordance with an embodiment, the secondary actions can also be activated by use of a user interface icon, e.g., "More?"

In accordance with an embodiment, to enable presentation of the memory event timeline and supported actions, the device and/or the media server can be configured to group listening data into memorable events, including, for example, subtyping media content into genres or artists of music which were listened to or otherwise consumed at, during or otherwise within or as part of that event, and associating the memory event with those genres, artists or other media content.

In accordance with an embodiment, such grouping can be performed by examining the listening history, including, for example: the listening history can be grouped primarily into time-based groups, for example [today] [this week] [this month] and [other1]. Then, within each of these primary groups, one or more secondary groups in known modes can be created, for example [car] [commute] [running] [party] [Summer '16] [Halloween '14] and [other2].

In accordance with an embodiment, those secondary groups where the listening history is not significantly different from [other2] can be discarded. Then, within all secondary groups that are not [other2]: the most prevalent 1-3 genres listened to within that group can be used, wherein each genre represents at least 25% of the listening during that event (and wherein the step completes if the sum of the genres represent 75% or more of the music within that group). The process can be similarly repeated for artists.

Then, in accordance with an embodiment, within the [other2] group, the most prevalent 1-3 genres listened to within [other2] are determined (with no requirement for at least 25%, and with the step completing if the sum of the genres represent 80% or more of the music within that group). The process can be similarly repeated for artists.

The above-described variations in determining the presentation of the memory event timeline, and various memory events, accommodates such instances, for example, when the user searches through the memory of commuting, it is generally the commuting memory that is most important to find associated music, while the genre in this instance is somewhat secondary. However, when a commuting/party/running memory is selected by tapping on the event, then a more detailed presentation of the associated genres or artists can be presented.

Figure 3:
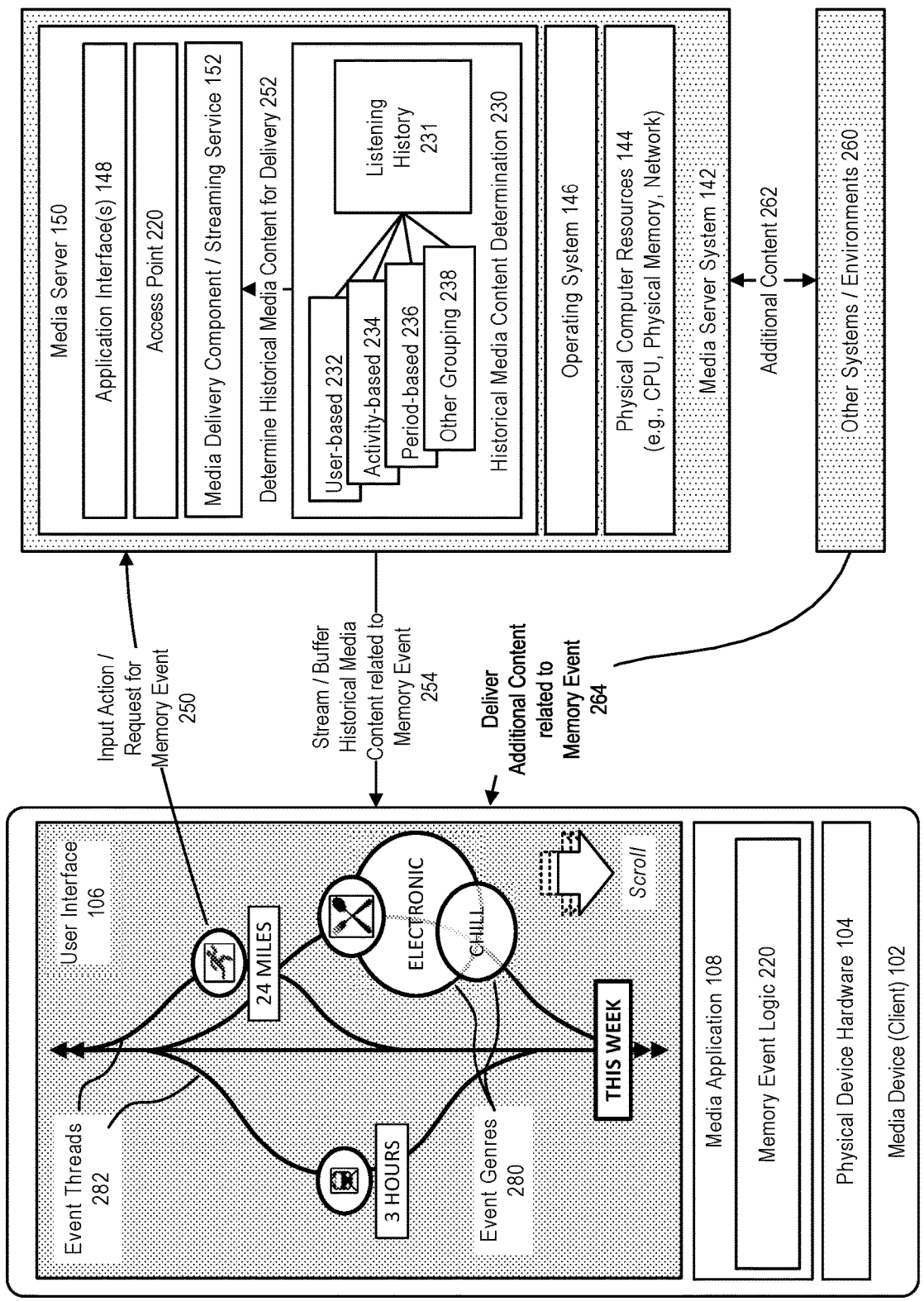
FIG. 3 further illustrates a system for providing access to media content associated with events, using a digital media content environment, in accordance with an embodiment.

FIG. 3 illustrates a system for providing access to media content associated with events, using a digital media content environment, in accordance with an embodiment.

As illustrated in FIG. 3, in accordance with an embodiment, the user can interact with the user interface to move backwards chronologically, for example by scrolling the memory event timeline in a direction away from the oldest displayed events. The user can also move forward again chronologically, by scrolling the memory event timeline in the opposite direction. While the user moves backward chronologically within the memory event timeline, events begin to be clustered.

In accordance with an embodiment, events can be clustered within the memory event timeline according to rules that change as events age.

For example, in accordance with an embodiment, the system can display events for a week during which the user interacted with the system preceding the user's current interaction with the system. If there is an apparent gap in the user's interaction with the system, displayed events may be empty of media content; or if no events are logged, then no preceding week may be displayed, and the media content consumed may be grouped according to a different set of rules applicable to aged events.

In accordance with an embodiment, events can also be grouped, for example, by genres 280 of media content.

In accordance with an embodiment, the timeline can display sub-timelines or event threads 282.

For example, a user's commute activities can be grouped together within an icon representing a single selectable event type, with a sub-timeline diverging from the main timeline to illustrate the period covered by the commute icon. The commute icon can be labeled with information, such as total commute time, while a sub-timeline spans the various days of the week.

In accordance with an embodiment, selecting an event type icon can expand the event type icon, or alternatively launch an event type screen that displays the media content consumed by the user for that event type.

In an alternative embodiment, selecting an event type icon can present a set of events, each of which can be individually selected for details of the media content consumed during that event.

In accordance with an embodiment, the timeline also clusters together total listening sessions for the week into icons (here labeled "Chill" and "Electronic") representing categories of music, with the "Electronic" icon being larger to represent a category of music from which a larger volume of media content was consumed relative to music categorized as "Chill". As another example, meals likewise can be clustered together and captured over a sub-timeline that spans an entire week.

For example, an "Exercise" icon can be presented on the interface spanning two different weeks and is selectable to display the media content consumed while exercising over the period of the sub-timeline. The "Exercise" icon can be labeled with information, for example the total distance run by the user during that period.

Figure 4:
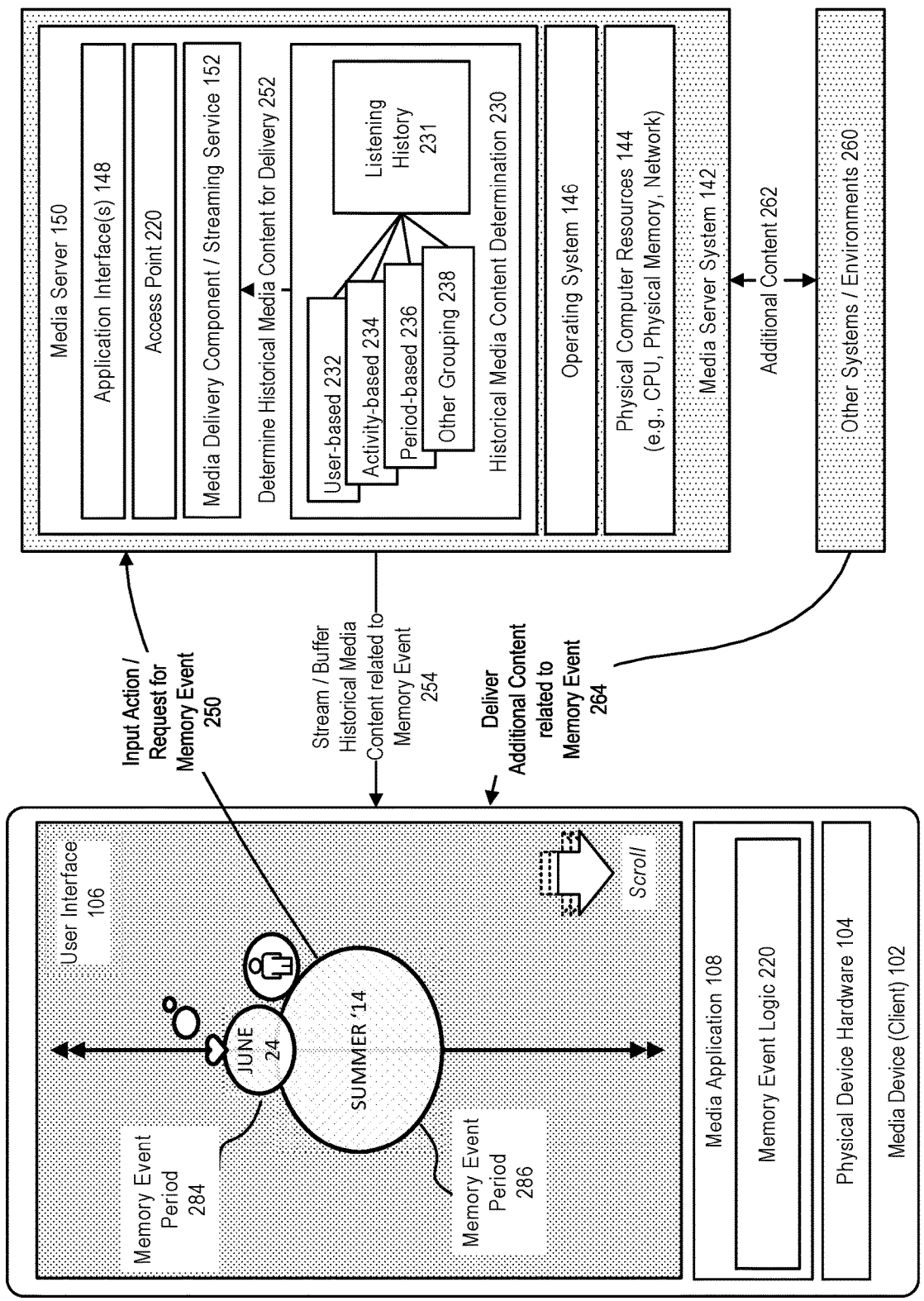
FIG. 4 further illustrates a system for providing access to media content associated with events, using a digital media content environment, in accordance with an embodiment.

FIG. 4 illustrates a system for providing access to media content associated with events, using a digital media content environment, in accordance with an embodiment.

As illustrated in FIG. 4, while the user moves further backwards chronologically within the memory event timeline, events and media content consumption can be clustered according to different rules and a history of the user's interaction with the system can be composed or presented more broadly, for example as memory event periods 284, 286.

For example, an entire summer season's-worth of media consumption can be grouped under a "Summer '14" icon. In accordance with an embodiment, selecting the "Summer '14" icon can expand the icon, or alternatively launch a season screen that displays the media content consumed by the user for that season.

In an alternative embodiment, selecting a particular season icon can present a set of event types, each of which can be individually selected for details of the media content consumed during for that event type.

In accordance with an embodiment, a single event icon can represent an important event in the user's life, for example a marriage engagement on "June 24". Such an event can be made to stand out in the clustered event on the timeline, just as such an event would stand out in a person's memory.

Figure 5:
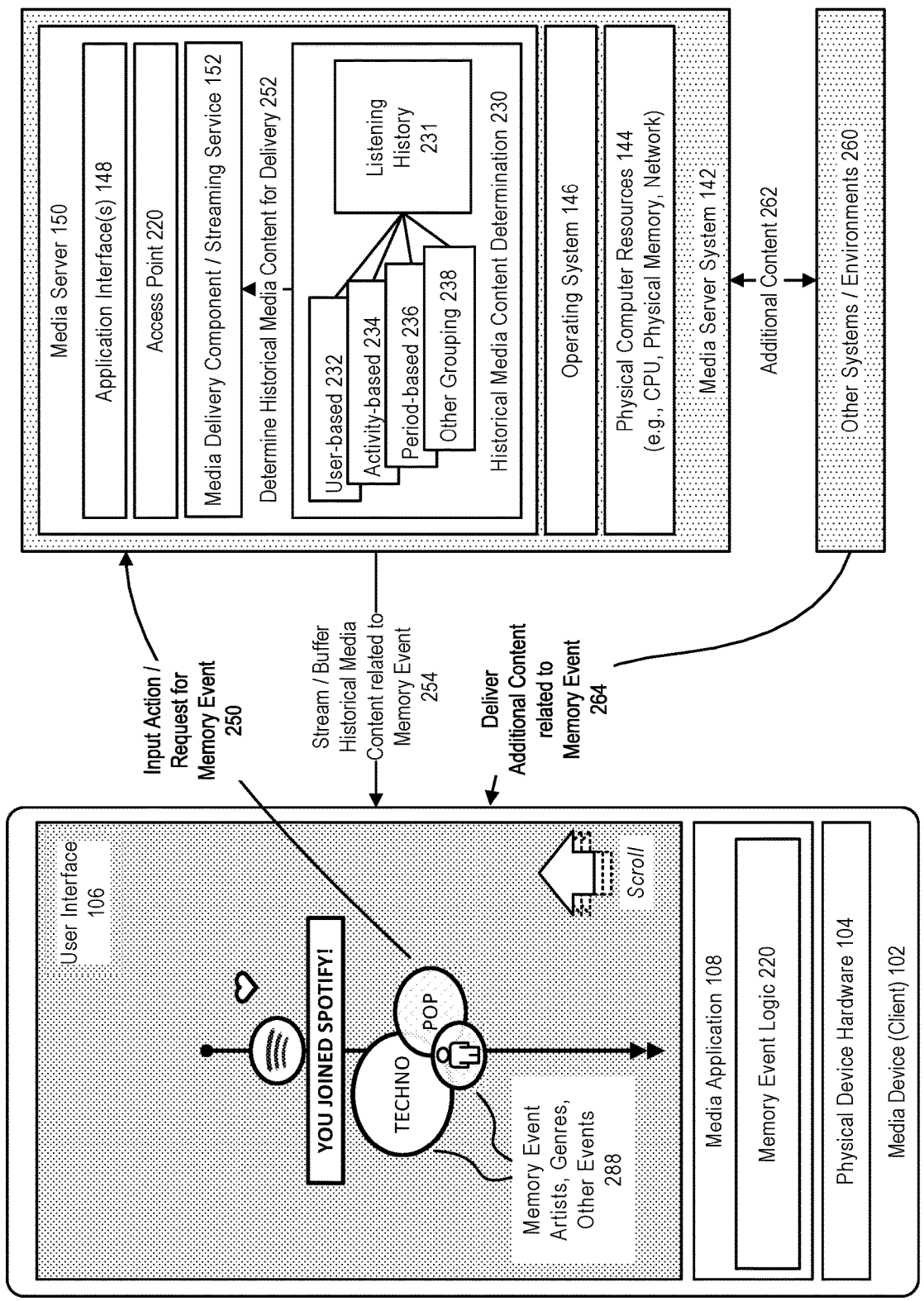
FIG. 5 further illustrates a system for providing access to media content associated with events, using a digital media content environment, in accordance with an embodiment.

FIG. 5 illustrates a system for providing access to media content associated with events, using a digital media content environment, in accordance with an embodiment.

As illustrated in FIG. 5, while the user moves still further backwards chronologically within the memory event timeline, the events and associated media content consumption can be clustered in ever broader groups representative of memory event artists, genres, or other events 288.

For example, the user's media consumption for a large period (e.g., six months) in the distant past (e.g., two years prior to the present interaction) can be grouped broadly into two icons representing the two most consumed categories of music—"Techno" and "Pop". The "Techno" icon is larger than the "Pop" icon to indicate a comparatively larger volume of media content consumed.

The above examples of various event types, media content categories, cluster sizes and types described herein are provided by way of example to illustrate an embodiment. In accordance with other embodiments, other types of media content categories, cluster sizes, groupings, time spans covered by groupings, and varying degrees of granularity of groupings can be applied.

For example, rather than a single "Pop" category of media content, the pop category can be broken down into, e.g., "Indie Pop" and "Bubblegum Pop". As another example, the exercise event type can be broken down into a running event type and a weight training event type. Groupings can also be used to bridge apparent gaps in time; for example, holiday event types such as a "New Year's Day" event type can be clustered across multiple years, rather than divided by year.

Figure 6:
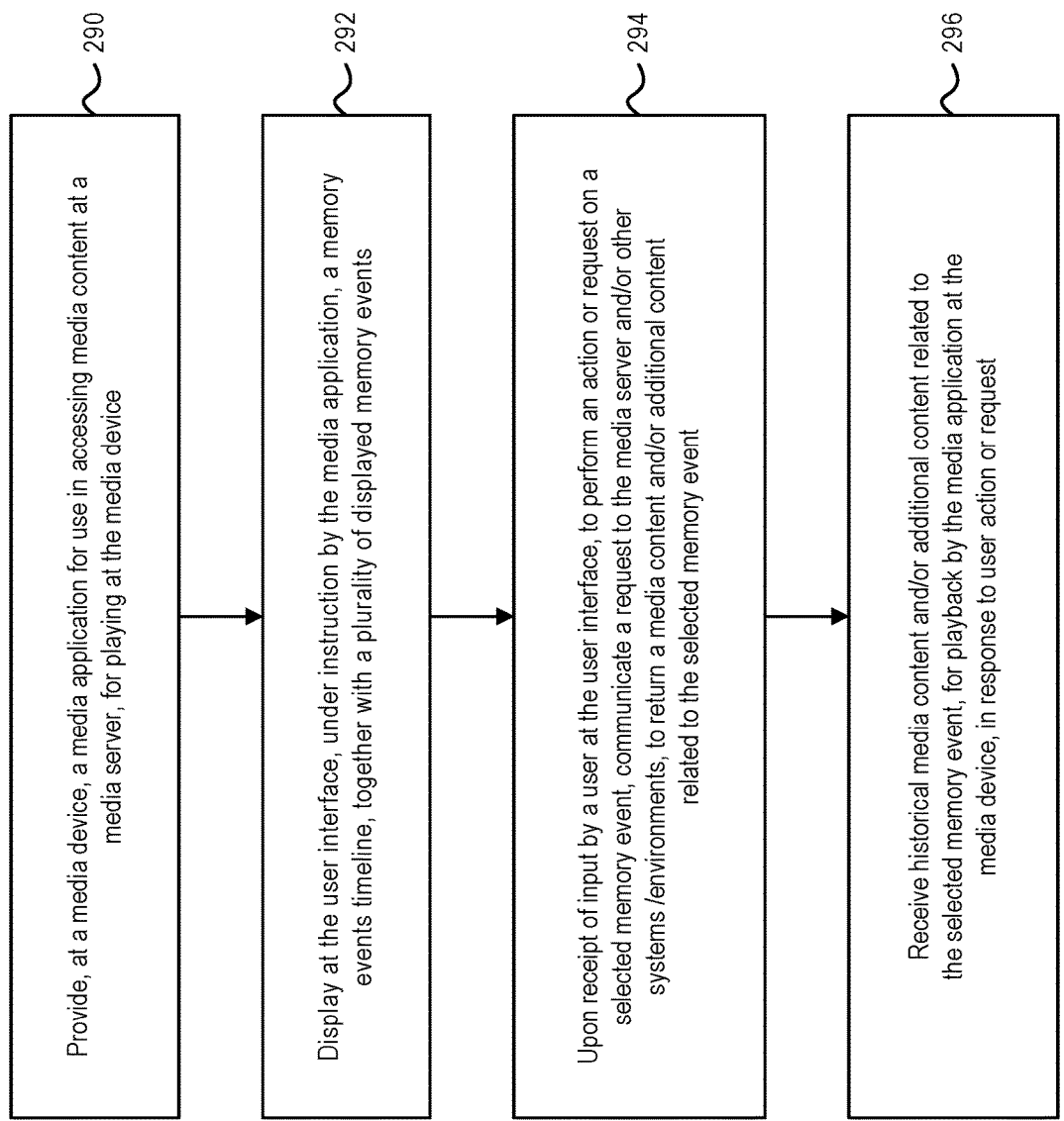
FIG. 6 illustrates a method for providing access to media content associated with events, using a digital media content environment, in accordance with an embodiment.

FIG. 6 illustrates a method for providing access to media content associated with events, using a digital media content environment, in accordance with an embodiment.

As illustrated in FIG. 6, at step 290, a media device and media application are provided for use in accessing media content at a media server, for playing at the media device.

At step 292, under instruction by the media application, a memory events timeline is displayed at a user interface, together with a plurality of displayed memory events.

At step 294, upon receipt of input by a user at the user interface, to perform an action or request on a selected memory event, a request is communicated to the media server and/or other systems/environments, to return a media content and/or additional content related to the selected memory event.

At step 296, the media device receives historical media content and/or additional content related to the selected memory event, for playback by the media application at the media device, in response to user action or request.

The above examples of various groupings and other features are provided by way of example, to illustrate some of the types of groupings and features which the system can support in accordance with an embodiment. In accordance with various embodiments, additional and/or different groupings and features can be supported.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing access to media content associated with memory events, comprising:
   at a server system associated with a media streaming service, the server system comprising one or more processors and memory:
      storing indications of historical media content consumed by a user of the media streaming service in a listening history of the user;
      for the user of the media streaming service, grouping the historical media content from the listening history of the user into a plurality of memory events, including a respective memory event associated with a genre and a time period, the respective memory event including the historical media content consumed by the user within the time period;
      enabling display, at an electronic device of the user, of a plurality of graphical representations of the plurality of memory events, wherein a respective graphical representation of the respective memory event identifies the genre and the time period of the historical media content consumed by the user, as determined from the listening history of the user;
      receiving an indication that the user has selected the respective memory event; and
      in response to receiving the indication that the user has selected the respective memory event, providing media content from the listening history of the user for the respective memory event including the historical media content consumed by the user within the time period.

2. The method of claim 1, wherein two or more of the plurality of memory events are associated with a respective genre and a respective time period.

3. The method of claim 2, wherein for each of the two or more memory events associated with a respective genre and a respective time period, a size of the corresponding graphical representation of the memory event corresponds to a number of media items of the respective genre consumed by the user during the respective time period.

4. The method of claim 1, wherein grouping the historical media content from the listening history of the user into the plurality of memory events includes applying grouping rules that change as the plurality of memory events age.

5. The method of claim 1, wherein the graphical representations of the plurality of memory events are displayed in a timeline.

6. The method of claim 1, wherein the plurality of memory events includes a respective memory event that is grouped based on a check-in from a third-party application.

7. The method of claim 1, wherein the plurality of memory events includes a respective memory event that is associated with an artist and a time period.

8. A server system associated with a media streaming service, the server system comprising:
   one or more processors;
   memory storing one or more programs, the one or more programs comprising instructions for:
      storing indications of historical media content consumed by a user of the media streaming service in a listening history of the user;
      for the user of the media streaming service, grouping the historical media content from the listening history of the user into a plurality of memory events, including a respective memory event associated with a genre and a time period, the respective memory event including the historical media content consumed by the user within the time period;
      enabling display, at an electronic device of the user, of a plurality of graphical representations of the plurality of memory events, wherein a respective graphical representation of the respective memory event identifies the genre and the time period of the historical media content consumed by the user, as determined from the listening history of the user;
      receiving an indication that the user has selected the respective memory event; and
      in response to receiving the indication that the user has selected the respective memory event, providing media content from the listening history of the user for the respective memory event including the historical media content consumed by the user within the time period.

9. The server system of claim 8, wherein two or more of the plurality of memory events are associated with a respective genre and a respective time period.

10. The server system of claim 9, wherein for each of the two or more memory events associated with a respective genre and a respective time period, a size of the corresponding graphical representation of the memory event corresponds to a number of media items of the respective genre consumed by the user during the respective time period.

11. The server system of claim 8, wherein grouping the historical media content from the listening history of the user into the plurality of memory events includes applying grouping rules that change as the plurality of memory events age.

12. The server system of claim 8, wherein the graphical representations of the plurality of memory events are displayed in a timeline.

13. The server system of claim 8, wherein the plurality of memory events includes a respective memory event that is grouped based on a check-in from a third-party application.

14. The server system of claim 8, wherein the plurality of memory events includes a respective memory event that is associated with an artist and a time period.

15. A non-transitory computer-readable storage medium storing one or more programs for execution by a server system associated with a media providing service, the one or more programs comprising instructions for:
   storing indications of historical media content consumed by a user of the media streaming service in a listening history of the user;

for the user of the media streaming service, grouping the historical media content from the listening history of the user into a plurality of memory events, including a respective memory event associated with a genre and a time period, the respective memory event including the historical media content consumed by the user within the time period;

enabling display, at an electronic device of the user, of a plurality of graphical representations of the plurality of memory events, wherein a respective graphical representation of the respective memory event identifies the genre and the time period of the historical media content consumed by the user, as determined from the listening history of the user;

receiving an indication that the user has selected the respective memory event; and in response to receiving the indication that the user has selected the respective memory event, providing media content from the listening history of the user for the respective memory event including the historical media content consumed by the user within the time period.

16. The non-transitory computer-readable storage medium of claim 15, wherein two or more of the plurality of memory events are associated with a respective genre and a respective time period.

17. The non-transitory computer-readable storage medium of claim 16, wherein for each of the two or more memory events associated with a respective genre and a respective time period, a size of the corresponding graphical representation of the memory event corresponds to a number of media items of the respective genre consumed by the user during the respective time period.

18. The non-transitory computer-readable storage medium of claim 15, wherein grouping the historical media content from the listening history of the user into the plurality of memory events includes applying grouping rules that change as the plurality of memory events age.

19. The non-transitory computer-readable storage medium of claim 15, wherein the graphical representations of the plurality of memory events are displayed in a timeline.

20. The non-transitory computer-readable storage medium of claim 15, wherein the plurality of memory events includes a respective memory event that is grouped based on a check-in from a third-party application.

* * * * *